US012614268B2

(12) United States Patent
Ho et al.

(10) Patent No.: US 12,614,268 B2
(45) Date of Patent: Apr. 28, 2026

(54) SYSTEM FOR ASSESSING A DAMAGE CONDITION OF A VEHICLE AND A PLATFORM FOR FACILITATING REPAIRING OR MAINTENANCE SERVICES OF A VEHICLE

(71) Applicant: Alpha AI Technology Limited, Telegraph Bay (HK)

(72) Inventors: Chun Yat Ho, Telegraph Bay (HK); Wilson Samuel Suen, Telegraph Bay (HK); Chiu Shing Tsang, Telegraph Bay (HK)

(73) Assignee: Alpha AI Technology Limited, Hong Kong (CN)

( * ) Notice: Subject to any disclaimer, the term of this patent is extended or adjusted under 35 U.S.C. 154(b) by 87 days.

(21) Appl. No.: 18/694,616

(22) PCT Filed: Nov. 8, 2022

(86) PCT No.: PCT/CN2022/130640
§ 371 (c)(1),
(2) Date: Mar. 22, 2024

(87) PCT Pub. No.: WO2023/083182
PCT Pub. Date: May 19, 2023

(65) Prior Publication Data
US 2024/0394861 A1 Nov. 28, 2024

(30) Foreign Application Priority Data
Nov. 9, 2021 (HK) ............................ 32021042148.5

(51) Int. Cl.
*G06T 7/00* (2017.01)
*G06Q 10/20* (2023.01)
(Continued)

(52) U.S. Cl.
CPC ........... *G06T 7/0002* (2013.01); *G06Q 10/20* (2013.01); *G06Q 40/0841* (2025.08);
(Continued)

(58) Field of Classification Search
CPC ...... G06T 7/0002; G06Q 10/20; G06V 10/82; G06V 10/764; G07C 5/0816
See application file for complete search history.

(56) References Cited

U.S. PATENT DOCUMENTS

| | | | |
|---|---|---|---|
| 10,684,124 B1 * | 6/2020 | Hanchett | ............. G06F 3/04815 |
| 10,713,726 B1 * | 7/2020 | Allen | ..................... G06Q 40/08 |

(Continued)

FOREIGN PATENT DOCUMENTS

CN 110287768 9/2019

*Primary Examiner* — Scott C Anderson
(74) *Attorney, Agent, or Firm* — Renner, Kenner, Greive, Bobak, Taylor & Weber

(57) ABSTRACT

A system for assessing a damage condition of a vehicle and a platform for facilitating repairing or maintenance services of a vehicle. The system comprises a damage identification module arranged to identify the one or more damages captured in a set of input images showing at least a portion of the vehicle; a component identification module arranged to identify one or more damaged components of the vehicle with the identified damages thereon; and an output module arranged to generate a damage assessment report associated with the identified damages and/or the identified damaged components of the vehicle.

20 Claims, 12 Drawing Sheets

(51) Int. Cl.
    *G06Q 40/08*           (2012.01)
    *G06V 10/764*        (2022.01)
    *G06V 10/82*         (2022.01)
    *G07C 5/08*          (2006.01)

(52) U.S. Cl.
    CPC ............ *G06V 10/764* (2022.01); *G06V 10/82*
           (2022.01); *G07C 5/0816* (2013.01); *G06T*
           *2207/20084* (2013.01); *G06V 2201/08*
                               (2022.01)

(56)                   References Cited

U.S. PATENT DOCUMENTS

| | | | | |
|---|---|---|---|---|
| 11,922,734 B1 * | 3/2024 | Kellett | ................... | G07C 5/085 |
| 2021/0049384 A1 * | 2/2021 | Morrow | ................. | G07C 5/008 |
| 2021/0278549 A1 * | 9/2021 | Kassas | ................. | G01S 19/485 |
| 2022/0107977 A1 * | 4/2022 | Marthouse | ............. | G06Q 40/08 |

* cited by examiner

USER 1

Vehicle Identification Number
XXXXXXX

Registration Mark
ABCD

| Regions | Damage type | Price |
|---------|-------------|-------|
| Tailgate | Dent | $10,000 |
| Bumper | Dent | $5,000 |
| Car Plate | Scratch | $500 |
| | Miscellaneous | $6,500 |

Total Price

$22,000

902

804

802

1002B

1004

1002A

SYSTEM FOR ASSESSING A DAMAGE CONDITION OF A VEHICLE AND A PLATFORM FOR FACILITATING REPAIRING OR MAINTENANCE SERVICES OF A VEHICLE

TECHNICAL FIELD

The invention relates to a system for assessing a damage condition of a vehicle and a platform for facilitating repairing or maintenance services of a vehicle, and particularly, although not exclusively, to an AI-based car damage assessment report system.

BACKGROUND

Car accidents can cause emotional stress and property damage. A lot of time goes into filing accident claims and paperwork following an already traumatic experience. While an insuree is responsible for covering the repair cost, the estimation itself is done by a car repair centre. The whole procedure involves experts from both sides, which often results in 3 weeks spent on each case.

It is also difficult to accurately assess the damage to a vehicle by an untrained person. Motorists who may have had an accident may wish to determine the costs of repair as quickly as possible so as to reach an appropriate settlement, or to budget for the repairs. Car buyers or renters may also wish to assess the costs to repair any specific damage to a vehicle so as to budget for a purchase price or repair costs. Unfortunately, as decisions may need to be made quickly, the delays in obtaining an accurate estimate may prevent a settlement or a transaction from being completed.

SUMMARY OF THE INVENTION

In accordance with a first aspect of the present invention, there is provided a system for assessing a damage condition of a vehicle, comprising a damage identification module arranged to identify the one or more damages captured in a set of input images showing at least a portion of the vehicle; a component identification module arranged to identify one or more damaged components of the vehicle with the identified damages thereon; and an output module arranged to generate a damage assessment report associated with the identified damages and/or the identified damaged components of the vehicle.

In an embodiment of the first aspect, the system further comprises a computer vision-based processor operable to function as the damage identification module and/or the component identification module.

In an embodiment of the first aspect, the computer vision-based processor includes a neural network processing engine.

In an embodiment of the first aspect, the computer vision-based processor is further arranged to estimate at least one attribute of the damage, for example, the at least one attribute includes a type of damage, a level of damage and dimension of the identified damages.

In an embodiment of the first aspect, the type of damage includes a dent or a scratch of the identified damaged component of the vehicle.

In an embodiment of the first aspect, the damage identification module is further arranged to categorize the captured damages based on the type of damage, the level of damage and the dimension of the identified damages.

In an embodiment of the first aspect, the system further comprises a structure detection module arranged to evaluate a structural damage associated with internal components of the vehicle based on the identified damages of the damaged components.

In an embodiment of the first aspect, the structure detection module comprises an internal damage simulator arranged to generate a skeleton structure of the vehicle based on the identified damages of the damaged components.

In an embodiment of the first aspect, the internal damage simulator is further arranged to remap the generated skeleton structure to a corresponding model structure of the vehicle to evaluate the structural damage of the vehicle.

In an embodiment of the first aspect, the internal damage simulator is arranged to select arbitrary feature points associated from predetermined parts of the vehicle to form the skeleton structure.

In an embodiment of the first aspect, the internal damage simulator comprises a pose estimation engine arranged to analyze the skeleton structure being generated.

In an embodiment of the first aspect, the damage assessment report includes a quotation of services associated with repairing or replacing the damaged component with the identified damages.

In an embodiment of the first aspect, the quotation of services is estimated based on big data analytics.

In an embodiment of the first aspect, the damage assessment report includes a quotation of add-on services associated with maintaining at least one miscellaneous item apart from repairing or replacing the damaged component.

In an embodiment of the first aspect, the quotation of services is further associated with predetermined models of vehicles and/or predetermined price range for repairing or replacing the damaged component.

In accordance with a second aspect of the present invention, there is provided a platform for facilitating repairing or maintenance services of a vehicle, comprising the system of the first invention, and a computer-implemented user-interface arranged to facilitate uploading the set of input images of the vehicle captured by a user, and optionally additional information associated with the user and/or the vehicle.

In an embodiment of the second aspect, the platform further comprises a service provider matching engine arrange to provide to the user details of a service provider recorded in a service provider database and/or the quotation of services offered by the service provider based on the generated damage assessment report.

In accordance with a third aspect of the present invention, there is provided method of assessing damage conditions of a vehicle, comprising the steps of: identifying the one or more damages captured in a set of input images showing at least a portion of the vehicle; identifying one or more damaged components of the vehicle with the identified damages thereon; and generating a damage assessment report associated with the identified damages and/or the identified damaged components of the vehicle.

In an embodiment of the third aspect, the method further comprises the step of estimating, by using a neural network processing engine and computer vision, at least one attribute of the damage, wherein the at least one attribute includes a type of damage, a level of damage and dimension of the identified damages.

In an embodiment of the third aspect, the type of damage includes a dent, scratch, crack, shattering, displacement, or any one or a combination thereof of the identified damaged component of the vehicle.

In an embodiment of the third aspect, the method further comprises the step of categorizing the captured damages based on the type of damage, the level of damage and the dimension of the identified damages.

In an embodiment of the third aspect, the method further comprises the step of evaluating a structural damage associated with internal components of the vehicle based on the identified damages of the damaged components.

In an embodiment of the third aspect, the step of evaluating the structural damage associated with internal components of the vehicle comprising the step of generating a skeleton structure of the vehicle based on the identified damages of the damaged components.

In an embodiment of the third aspect, the step of evaluating the structural damage associated with internal components of the vehicle comprising the step of remapping the generated skeleton structure to a corresponding model structure of the vehicle to evaluate the structural damage of the vehicle.

In an embodiment of the third aspect, the step of evaluating the structural damage associated with internal components of the vehicle comprising the step of selecting arbitrary feature points associated from predetermined parts of the vehicle to form the skeleton structure.

In an embodiment of the third aspect, the step of evaluating the structural damage associated with internal components of the vehicle is performed by using pose estimation.

In an embodiment of the third aspect, the damage assessment report includes a quotation of services associated with repairing or replacing the damaged component with the identified damages.

In an embodiment of the third aspect, the quotation of services is estimated based on big data analytics.

In an embodiment of the third aspect, the damage assessment report includes a quotation of add-on services associated with maintaining at least one miscellaneous item apart from repairing or replacing the damaged component.

In an embodiment of the third aspect, the quotation of services is further associated with predetermined models of vehicles and/or predetermined price range for repairing or replacing the damaged component.

In an embodiment of the third aspect, the method further comprises the steps of facilitating uploading the set of input images of the vehicle captured by a user to a service platform, and optionally additional information associated with the user and/or the vehicle, so as to facilitate repairing or maintenance services of the vehicle.

In an embodiment of the third aspect, the method further comprises the step of providing to the user, using a service provider matching engine, details of a service provider recorded in a service provider database and/or the quotation of services offered by the service provider based on the generated damage assessment report.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

Figure 1:
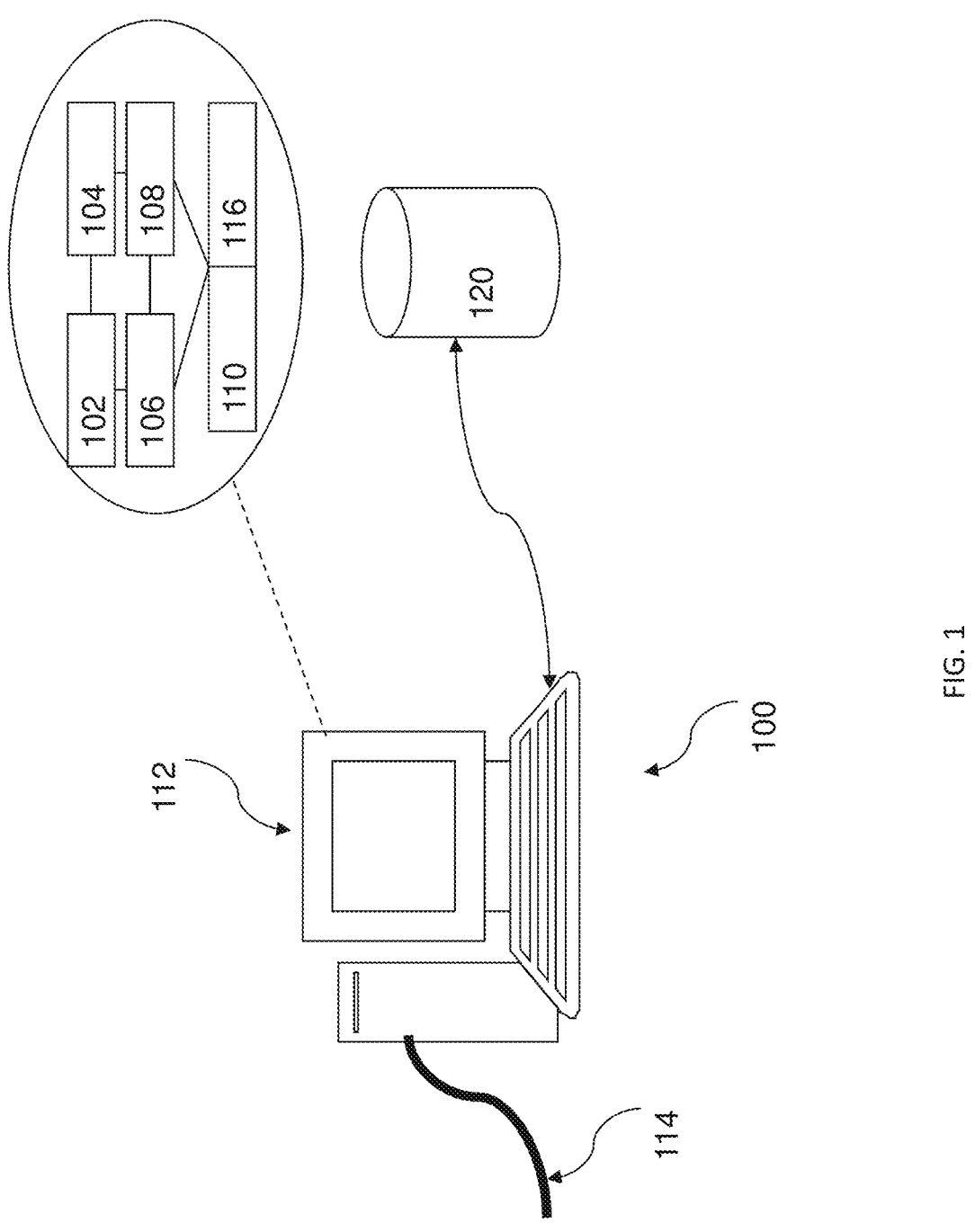
FIG. 1 is a schematic diagram of a computer server which is arranged to be implemented as a system for assessing a damage condition of a vehicle in accordance with an embodiment of the present invention.

Referring to FIG. 1, an embodiment of the present invention is illustrated. This embodiment is arranged to provide a system for assessing a damage condition of a vehicle. The system comprises: a damage identification module arranged to identify the one or more damages captured in a set of input images showing at least a portion of the vehicle; a component identification module arranged to identify one or more damaged components of the vehicle with the identified damages thereon; and an output module arranged to generate a damage assessment report associated with the identified damages and/or the identified damaged components of the vehicle.

In this example embodiment, the interface and processor are implemented by a computer having an appropriate user interface. The computer may be implemented by any computing architecture, including portable computers, tablet computers, stand-alone Personal Computers (PCs), smart devices, Internet of Things (IoT) devices, edge computing devices, client/server architecture, "dumb" terminal/mainframe architecture, cloud-computing based architecture, or any other appropriate architecture. The computing device may be appropriately programmed to implement the invention.

In this embodiment, the system is arranged to allow user to upload images showing different views or parts of a vehicle, such as a car, and to obtain a damage assessment report associated with identified damages on different parts/ components of the car with an estimated cost for repairing these damages. The system is capable of identifying different types of damages as well as the severeness of the damages using AI and providing accurate estimation of repair cost, without needing an inspection being performed by technicians which may be time-consuming and with human bias.

As shown in FIG. 1 there is a shown a schematic diagram of a computer system or computer server 100 which is arranged to be implemented as an example embodiment of a system for assessing a damage condition of a vehicle. In this embodiment, the system comprises a server 100 which includes suitable components necessary to receive, store and execute appropriate computer instructions. The components may include a processing unit 102, including Central Processing United (CPUs), Math Co-Processing Unit (Math Processor), Graphic Processing United (GPUs) or Tensor processing united (TPUs) for tensor or multi-dimensional array calculations or manipulation operations, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 may include instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or hand-held computing devices, Internet of Things (IoT) devices, smart devices, edge computing devices. At least one of a plurality of communications link may be connected to an external computing network through a telephone line or other type of communications link.

The server 100 may include storage devices such as a disk drive 108 which may encompass solid state drives, hard disk drives, optical drives, magnetic tape drives or remote or cloud-based storage devices. The server 100 may use a single disk drive or multiple disk drives, or a remote storage service 120. The server 100 may also have a suitable operating system 116 which resides on the disk drive or in the ROM of the server 100.

The computer or computing apparatus may also provide the necessary computational capabilities to operate or to interface with a machine learning network, such as neural networks, to provide various functions and outputs. The neural network may be implemented locally, or it may also be accessible or partially accessible via a server or cloud-based service. The machine learning network may also be untrained, partially trained or fully trained, and/or may also be retrained, adapted or updated over time.

Figure 2:
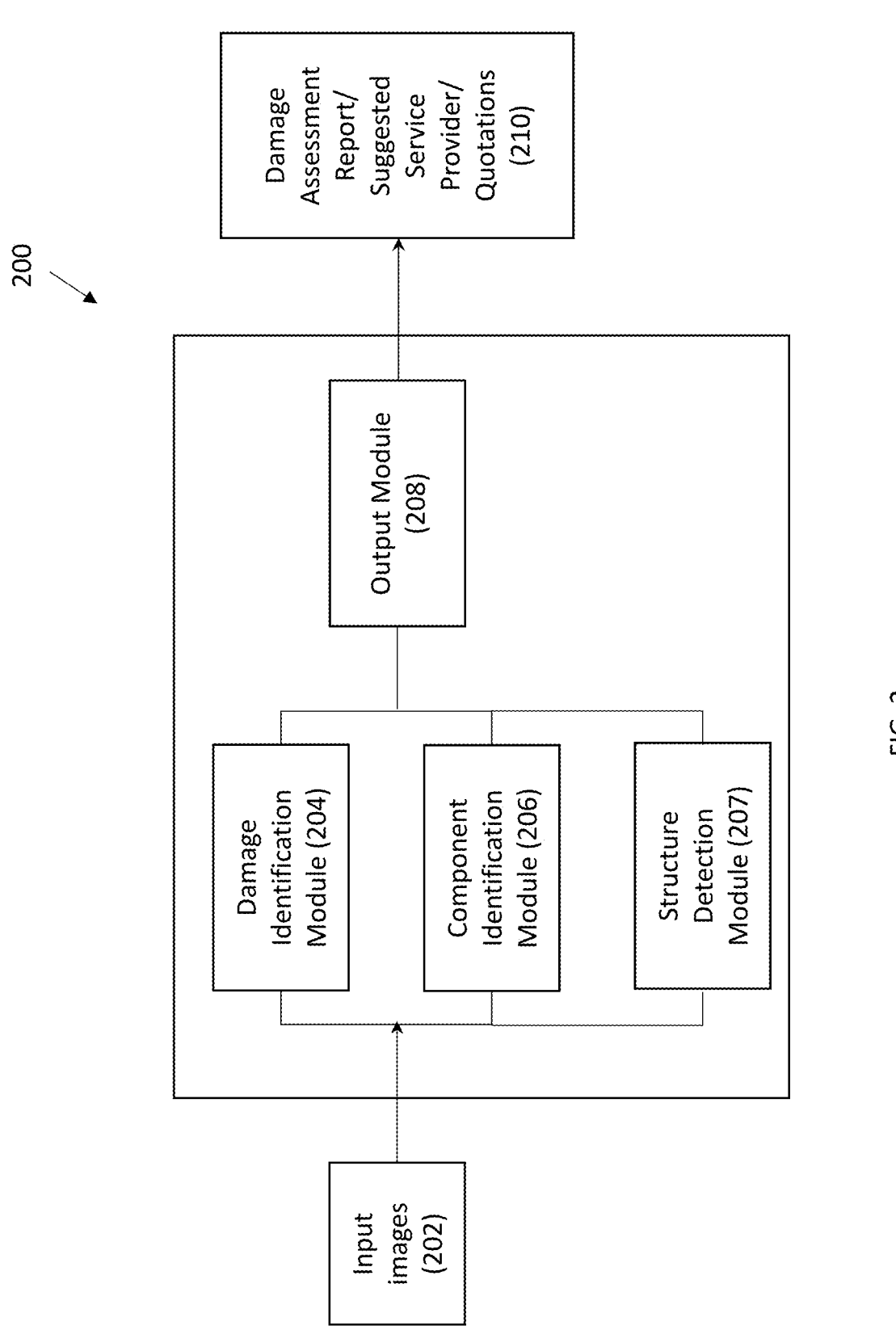
FIG. 2 is a block diagram showing a system for assessing a damage condition of a vehicle in accordance with an embodiment of the present invention.

With reference to FIG. 2, there is shown an embodiment of the system 200 for assessing a damage condition of a vehicle. In this embodiment, the server 100 is used as part of a system 200 as arranged to receive input images 202 showing different views and components of a car, with some of these components having damages such as dents and/or scratches on them. The damage identification module 204 and the component identification module 206 cooperate to identify sizes and positions of damages as shown in the images 202, as well as the type of damages, preferably using a computer-vision based processing method, and more preferably using a neural network or deep-learning machine learning method.

For example, the images showing the whole car captured at one or more of the front, rear and two sides of the car, and some additional close up views showing damages on different parts/components of the car may be processed by the system 200, then the damage identification module and the component identification module will be able to identify which parts/components of the car have been damaged, e.g. scratches on front bumpers and doors at the right side of the car, or multiple dents on the tail gate of the car, taking into account also different attributes (e.g. size and depth) of the dents/scratches so as to evaluate the severeness of each of these damages. Other forms of damage may also be detected by the damage identification module, including chips, flaking, cracks, penetrations or apertures, shattering or parts or components, missing parts, misalignments or displacement of parts or components, corrosion, wearing or other forms of damages which may be presented on the parts or components of the vehicle.

In addition, these identified results will be passed to an output module 208 which consolidate these results in a damage assessment report 210 which may list these identified damages. Optionally or additionally, quotations of services, or suggested services provider or repair centre associated with repairing these damages may also be provided in the report for various purposes.

With reference also to FIGS. 3 to 11, various example embodiments of the platform for facilitating repairing services and the system for assessing damages are further described.

Figure 3:
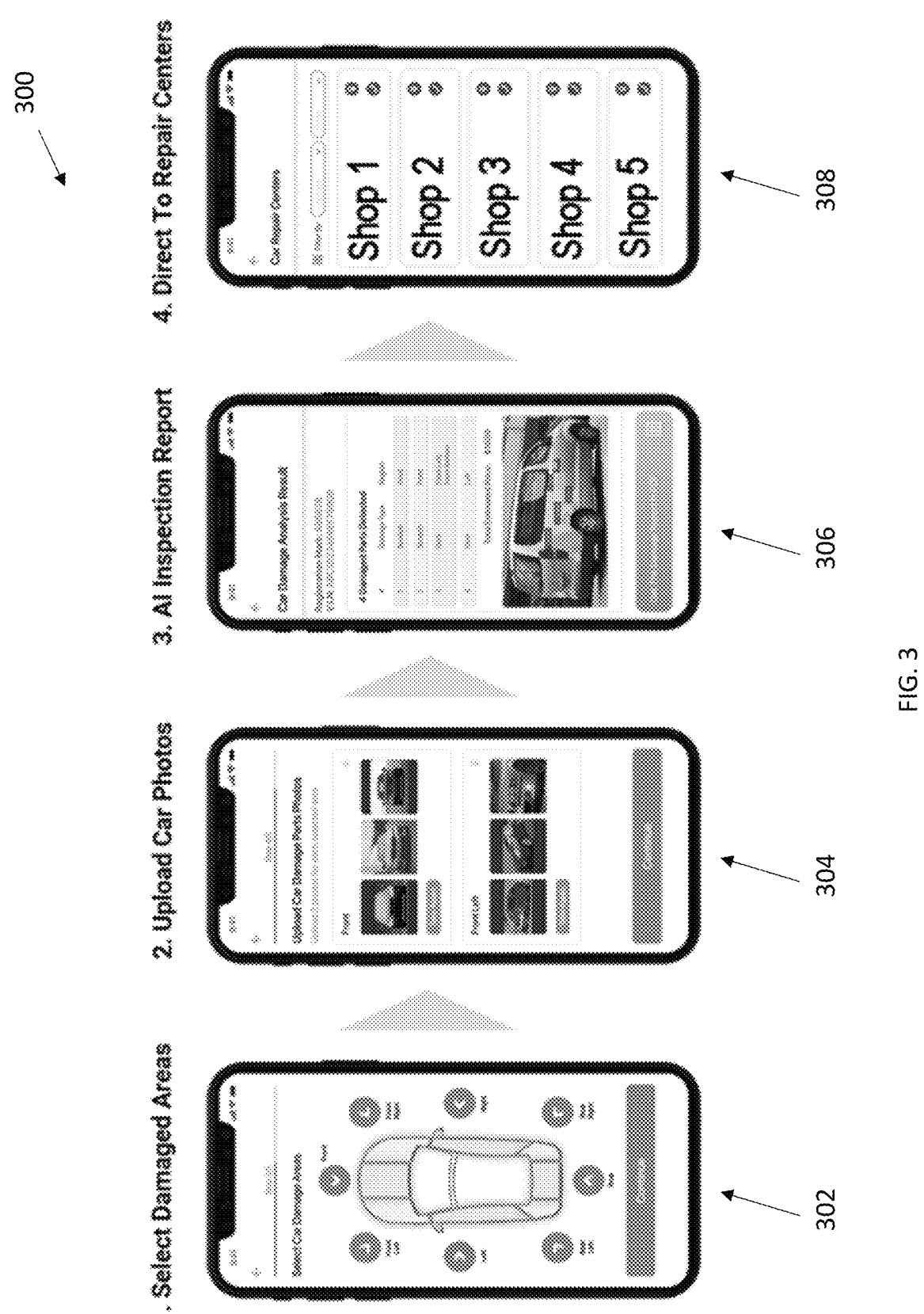
FIG. 3 is an illustration showing a flow of operations in a user application provided in a platform for facilitating repairing or maintenance services of a vehicle in accordance with an embodiment of the present invention.
Figure 4:
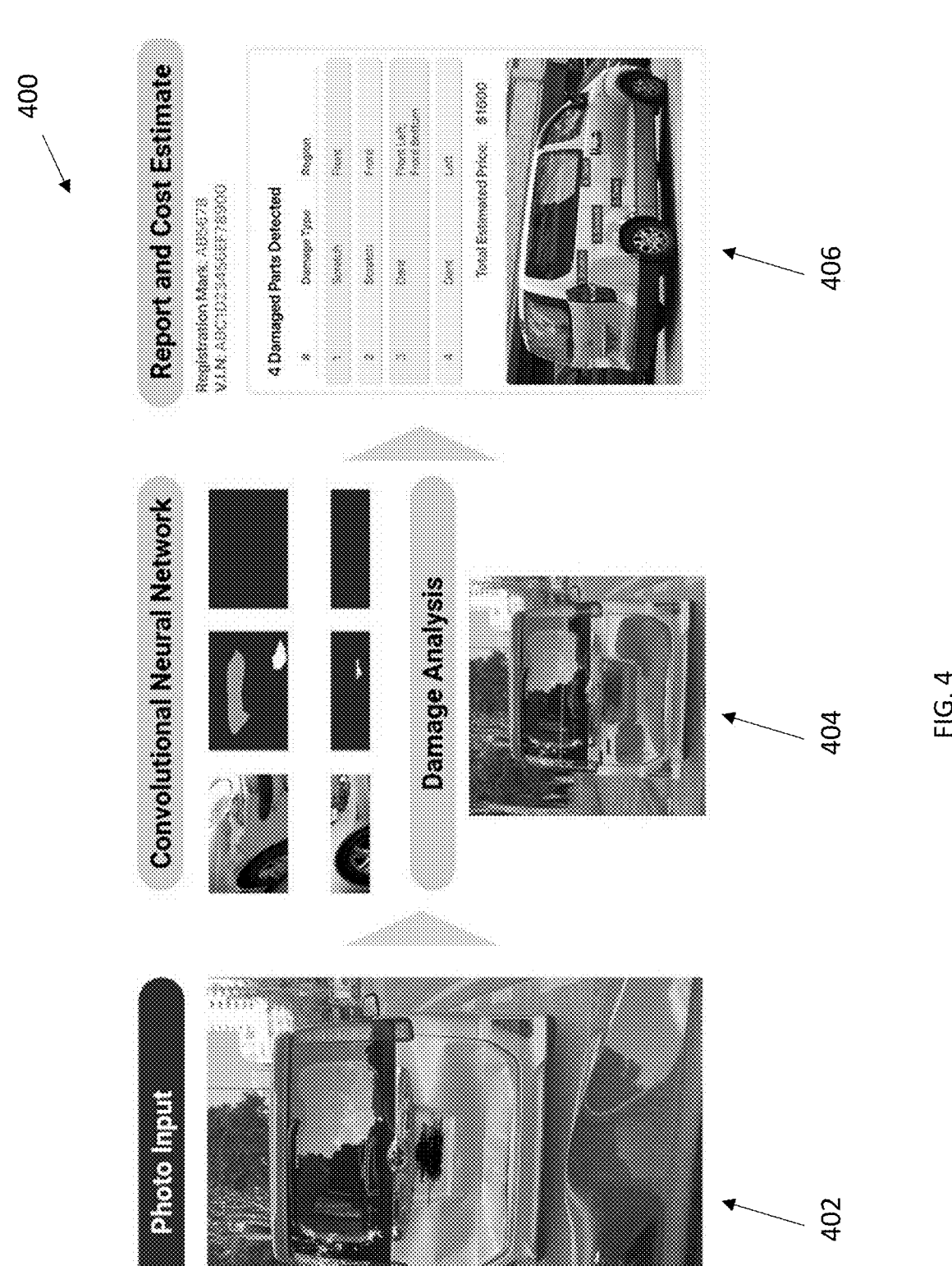
FIG. 4 is a flow diagram showing the operation of the platform upon receiving a request of the user operating the user application provided in FIG. 3.

With reference to FIGS. 3 and 4, the car damage inspection app guides end-users to take photos of a car right at the accident scene at both farther and nearer distances, additional information may also be provided in the user application. With only four steps: selecting damaged areas, uploading car photos, running the AI analysis, then the driver can get an inspection report and get claims. The app may also refer the cases to suggested repair centres or service provider.

Referring to FIG. 3, the process 300 may start at step 302, in which users can evaluate car damages when accident happens, by selecting the damaged areas. At step 304, images of the vehicle at different angles, as well as the scene of the accident, may be selected or captured using the photo taking function of the application, so as to prepare the images showing all damages on the vehicle that needs to be repaired. At step 306, upon uploading the image to the platform, the images may be instantly reviewed, and in return the quotation of the service (i.e. estimated repair costs) are provided. Finally, at step 308, a list of approved repair centres may be provided to the user for further action.

Referring to FIG. 4, there is shown an example operation 400 of the system upon receiving input photos at step 402, the neural network processing engine then perform damage analysis of the input photos, e.g. using convolutional neural network to identify the damages of the vehicle at step 404, and then a report including cost estimate for repairing the vehicle may be provided at step 406. In this example, scratches and dents at four different regions are recognized by the convolution neural network, and the estimated cost for repairing these damages are $1,600.

In an alternative example, following an accident, car owners may take and/or upload photos of their damaged car, e.g. with close up images as shown in FIGS. 5 to 8, using the app. The AI model (i.e. the damage identification module and the component identification module) may then detect the damaged areas and assess the damage degree within seconds. An inspection report, or a damage assessment report 902 as shown FIG. 9, with a quotation of services or repair cost estimates provided immediately.

Preferably, the damage identification module may further categorize the captured damages based on the type of damage, the level of damage and the dimension of the identified damages. For example, damages such as scratches, dents, misplacement may be grouped into smaller categories to determine their severity of the damages in the entire vehicle.

Figure 5:
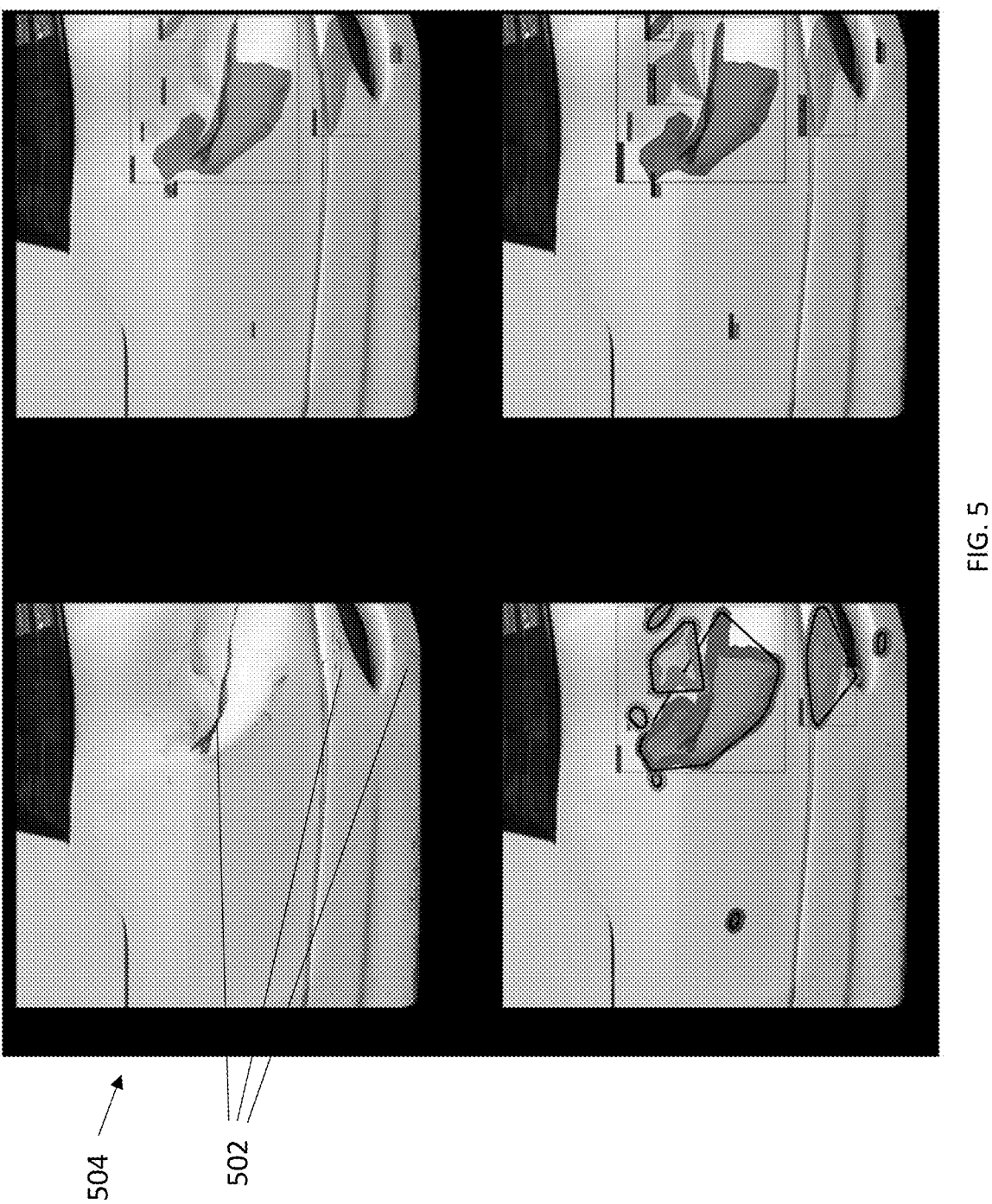
FIG. 5 is a set of images showing scratches on a bumper of a car and damages identified by the system of FIG. 2.
Figure 6:
FIG. 6 is another set of images showing scratches on a bumper of a car and damages identified by the system of FIG. 2.
Figure 7:
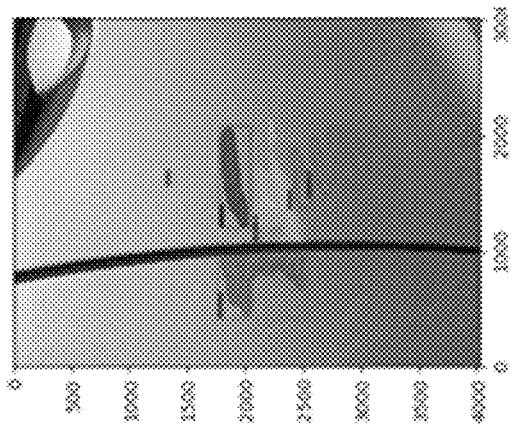
FIG. 7 is a set of images showing scratches on a pair of doors of a car and damages identified by the system of FIG. 2.
Figure 7:
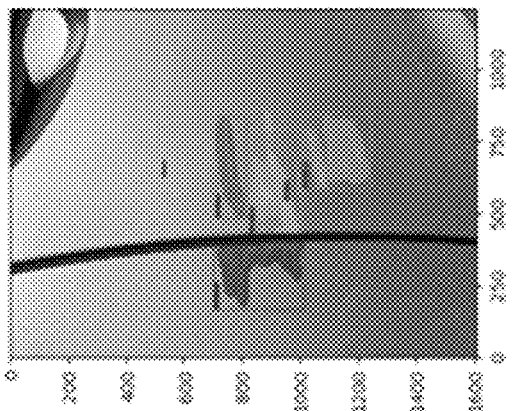
Figure 7:
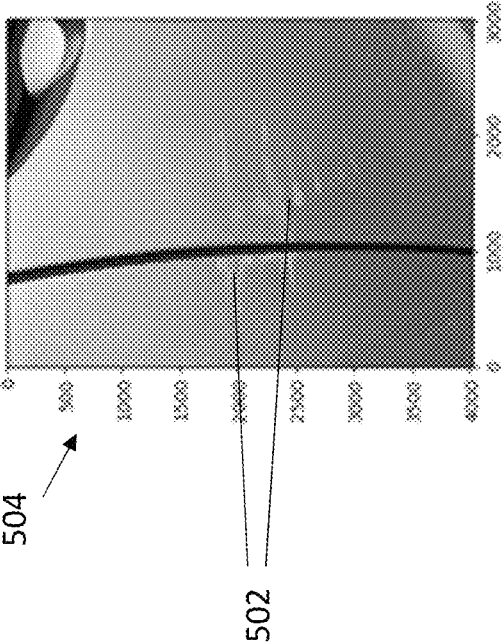
Figure 7:
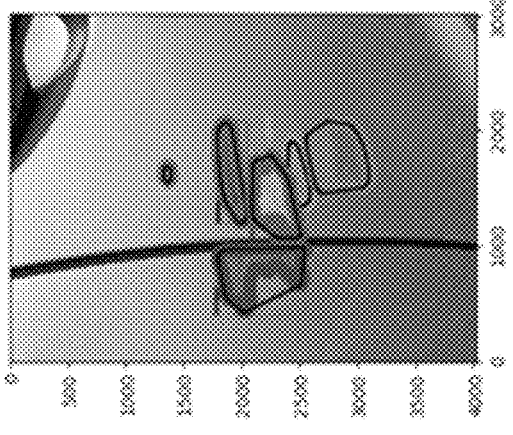
Figures 8, 9:
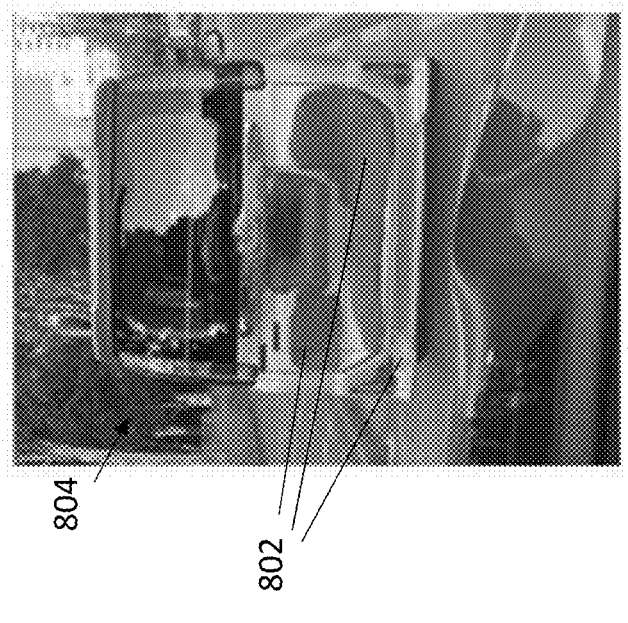
FIG. 8 is an image showing dents on a tailgate of a car and damages identified by the system of FIG. 2.
FIG. 9 is an illustration of a damage assessment report including a quotation of services associated with repairing or replacing the damaged component with the identified damages provided by the system of FIG. 2.

For example, referring to FIGS. 5 to 7, external damages 502 such as scratches and dents on a bumper or doors of a car 504 are identified, but these damages 502 may be relatively minor as these damages may not affect the integrity of the mechanical structure of the entire vehicle 504. However, the identified damages 802 in the vehicle 804 as shown in FIG. 8 may be more severe as the dent and scratches at the tailgate being identified may indicate that the vehicle might have receive a significant impact in a car accident, therefore it is possible that internal structural member of the vehicle at the rear portion may require further inspection and/or repairing.

These accident-related photos and cost estimates may also be sent to partnered car repair centres. Using this platform, these centres may also accept the quotation and car owners could pick any centre they like. In addition, a car insurer may also immediately receive an insurance claim request being forwarded, and after confirmation, the insurance claim will be transferred to the bank account of the car owner account as soon as possible.

Preferably, for data collection and annotation process performed by the computer-vision based processor, the more varied the images are, the better the model will be able to classify images appropriately. In the context of car damage assessment, building up extensive and diversified data sets requires collaboration of multiple parties: drivers submitting quality photos of their cars, insurance companies sharing the available data, and integration with repair centres involved in the repair process.

Preferably, data augmentation may be a solution to the data-space problem of limited data, to improve the execution of their models and expand limited datasets to take benefit of the abilities of big data. Randomly rotation, zooming, dimension shift and flipping renovation plans to differ the generated data.

In addition, pre-processing data sets may help speeding up and obtaining better training results for models. This activity may span a variety of tasks: applying filters, removing noise, enhancing contrast, downsampling videos, etc. The main goals can be associated with a) detecting the vehicle body parts and b) locating the damages. To further enhance accuracy, numerous corrections may be needed: e.g., more input data, improved algorithms. For estimating the damage extent, initially applied binary classification and then ran the data set through machine learning algorithms built.

Preferably, the computer vision-based processor includes a neural network processing engine, such as a convolutional neutral network (CNN) implemented machine learning model. The Car Damage Recognition system may be a set of deep learning algorithms using one or more convolutional neutral networks which may individually or in combination identify and/or classify the components of the vehicle and the type of damage found on the components. Labelled car damage photos or videos from both offline and online may be collected for training the CNN, and sets of pictures may be fed into a deep learning model to train the overall model for this set of inputs. The damage detection algorithm increases overall damage assessment accuracy as it relies on constant evaluation by the algorithm, which may further eliminate human bias.

Figure 10B:
FIG. 10B is an image showing an alternative skeleton of the vehicle different from the one in FIG. 10A.
Figure 10A:
FIG. 10A is an image showing a vehicle and a skeleton of the vehicle generated by the structure detection module of the system of FIG. 2.

Optionally or additionally, with reference to FIG. 2, the system further comprises a structure detection module 207 arranged to evaluate a structural damage associated with internal components of the vehicle based on the identified damages of the damaged components. With reference to FIGS. 10A and 10B, the structure detection module 207 may comprise an internal damage simulator arranged to generate a skeleton structure of the vehicle based on the identified damages of the damaged components. In this example, the car frame skeleton models 1002A, 1002B were generated based on different features points associated with different parts of the same vehicle 1004, and may emphasize internal structural integrality of different parts of the vehicle 1004 accordingly.

Preferably, the internal damage simulator may comprise a pose estimation engine arranged to analyze the skeleton structure being generated. Referring the FIGS. 10A and 10B, the system may select arbitrary feature points to form the car frame skeleton model 1002A, 1002B. The skeleton may represent the whole car structure including all parts, such as key structures including A/B/C pillars, head lights, wheels, bumpers, etc., of the car.

If skeleton structure of a specific model of vehicle is available, the internal damage simulator may remap the generated skeleton structure to a corresponding model structure of the vehicle to evaluate the structural damage of the vehicle.

Figure 11:
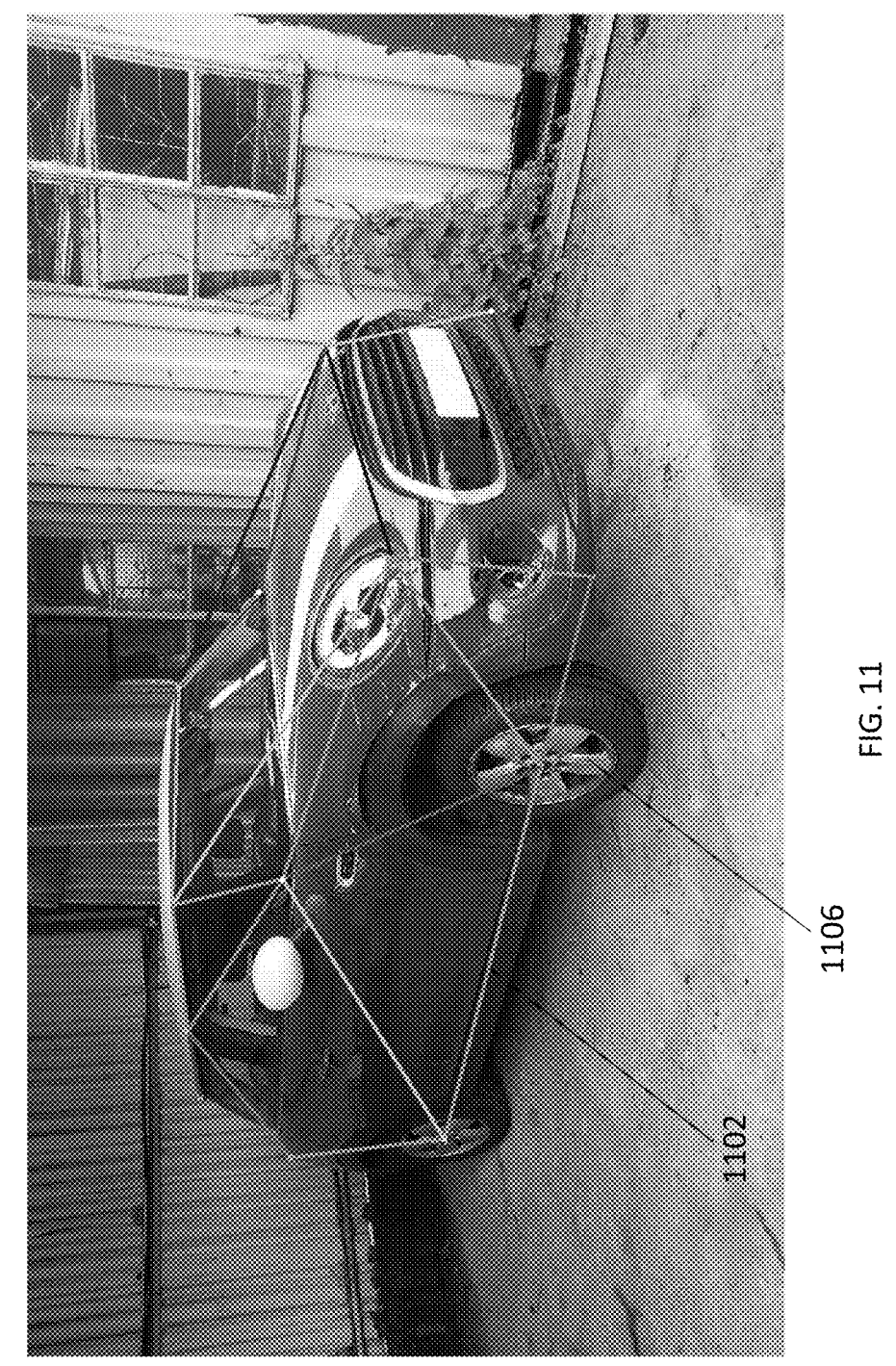
FIG. 11 is an image showing a damaged vehicle and a skeleton of the damaged vehicle generated by the structure detection module of the system of FIG. 2.

For example, referring to FIG. 11, the front portion of the vehicle 1104 and the front wheel 1006 on the right were damaged in an accident. The system may obtain a skeleton structure 1002 of the vehicle submitted by the user and the generated skeleton is found to be distorted (since the crashed parts are dislocated from their original positions) when compared to the car frame skeleton of the same model stored in a database, the system will have a higher confident to conclude that internal damage to the structure of the vehicle 1104 is detected, even though the internal parts of the vehicle 1104 may not be visible or observable from the image uploaded.

Advantageously, the skeleton structure enabled the system to locate the area found in the damage detection, and determine which car part is damaged, as this is directly linked to the part cost, and the repair cost will be estimated accordingly. In some examples, damages on certain car parts may be unrecoverable and subject to replacement, hence the repair cost will be calculated with respect to the car part price.

The quotation of services may be further associated with predetermined models of vehicles and/or predetermined price range for repairing or replacing the damaged component. With the combination of the location of the damage and the predicted structure, the system may determine which part of the car is needed to perform what kind of repair, e.g. replace, repair, tighten, etc. The price of the repair action may be measured according to the car model, where a list of the prices of different car parts and the relative price range for fixing each item may be used to provide accurate estimates to the user immediately.

In addition, the damage assessment report may include a quotation of add-on services associated with maintaining at least one miscellaneous item apart from repairing or replacing the damaged component. For example, the miscellaneous items may be listed as an add-on on top of the repair, trained by existing data on external damage as inference to the internal damages. Combining all items that will provide a more accurate prediction of the cost for the whole repair.

Figure 12:
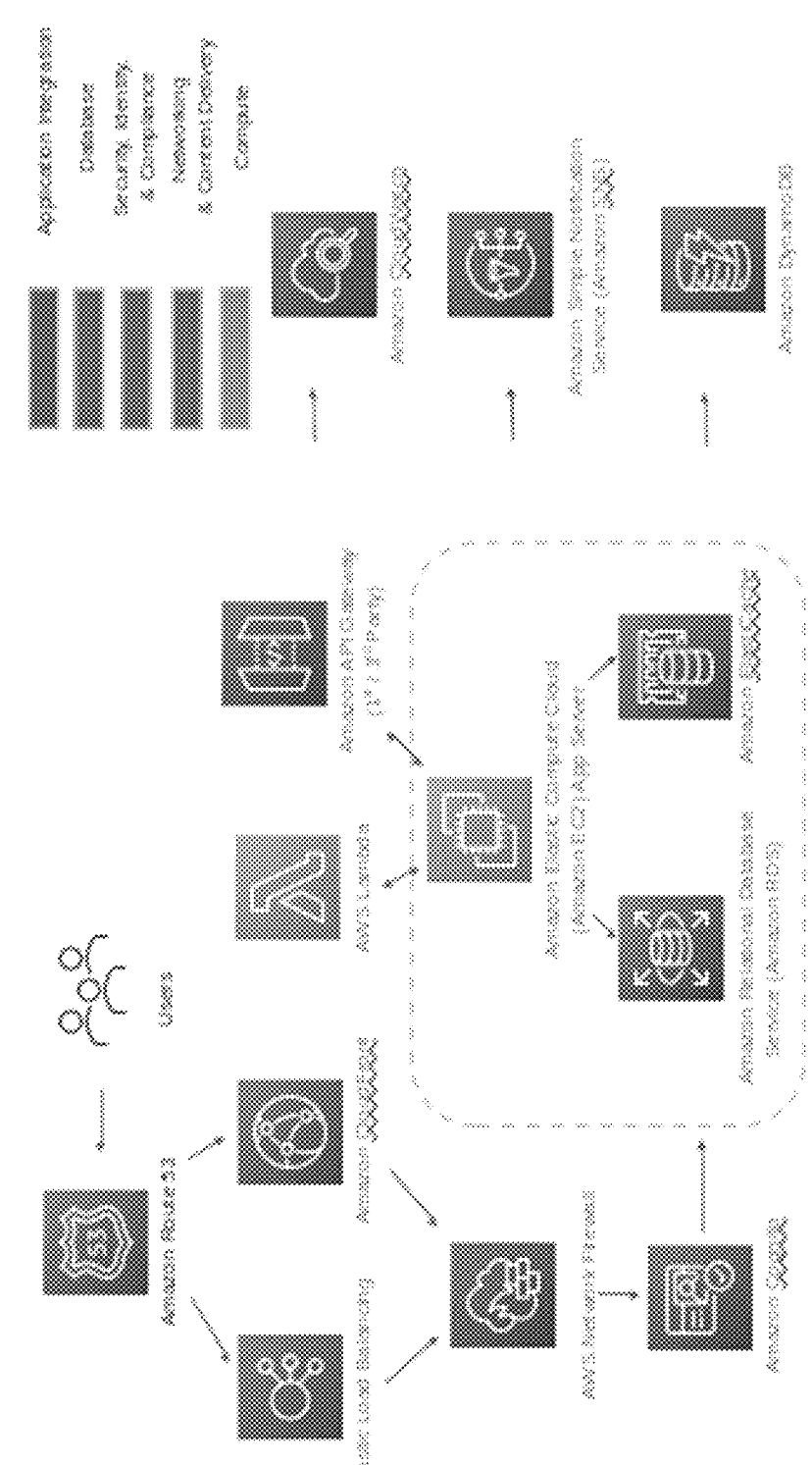
FIG. 12 is an illustration showing backend architecture of the platform for facilitating repairing or maintenance services of a vehicle in accordance with an embodiment of the present invention in accordance with embodiments of the present invention.
Figure 13:
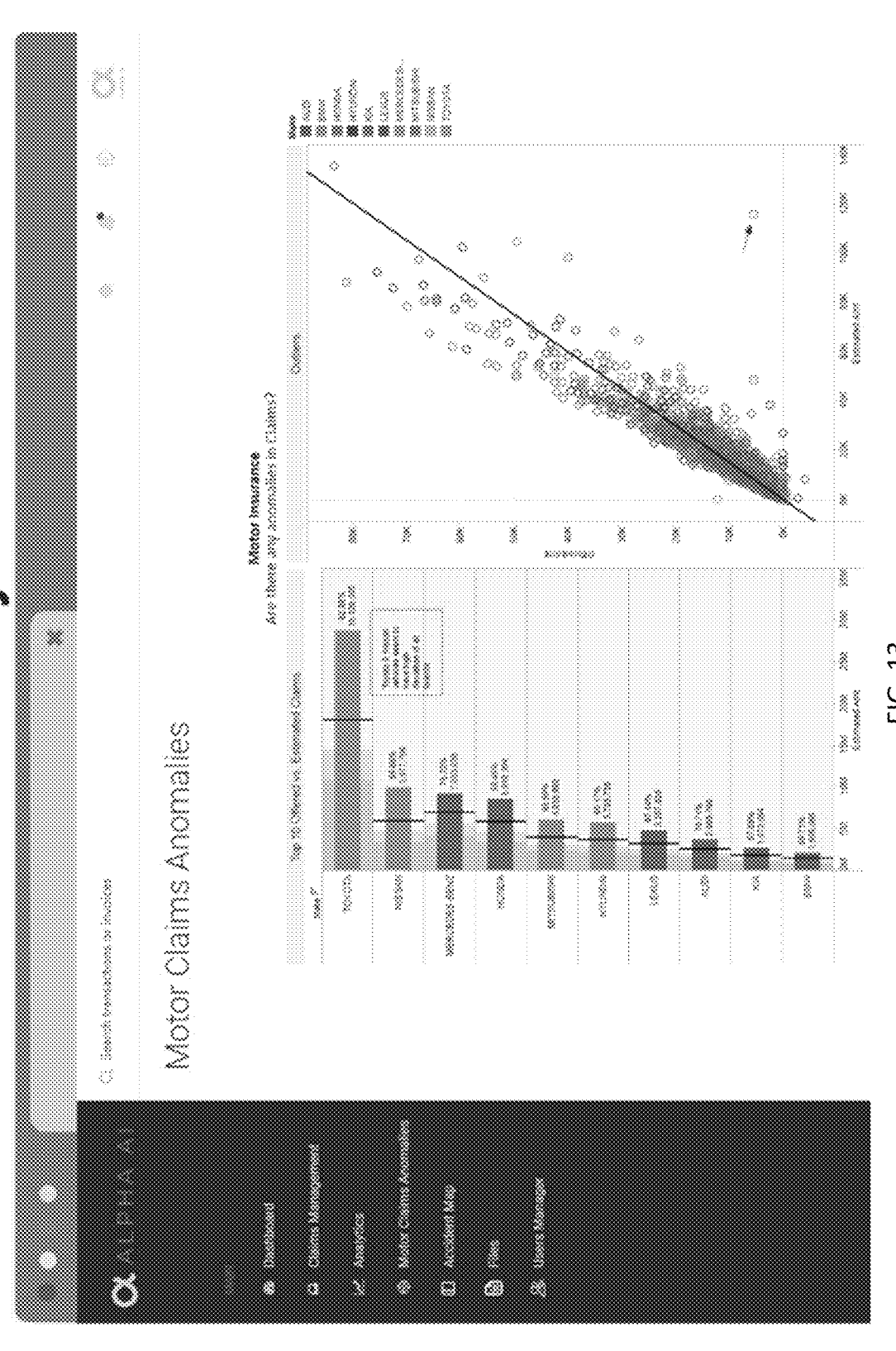
FIG. 13 is an illustration showing AI-based features of the present invention in accordance with embodiments of the present invention.

With reference to FIGS. 12 and 13, the platform may be implemented based on a backend architecture which involve AWS network so as to provide all necessary processing modules of the system. In addition, the quotation of services may be estimated based on big data analytics, which further prevent frauds by performing extra data check in the market.

When estimating service quotation, the difference in car insurance policy and repair cost assumptions in different countries may also be considered, and therefore big data analytics may also help improving the accuracy of the estimation.

For example, referring to FIG. 11, a regression method may be employed to allow spotting any claim anomalies, and a dashboard may be used for facilitating visualizing the claims statistic for each car brand. In addition, with similar accident characteristics, it is possible to offer predictive analysis to assess any total loss of vehicle in similar cases.

Other features in the user application and/or the system may also be included to further improve the identification of damages and estimation of repair costs in some preferred embodiments, such as:

Environment factors in the AI model—rain, snow, dark, bright.

use of video for the training and applications.

Further apply on car valuation.

3D model to better train the model

Fraud detection model to review all claims transactions

Localization—train popular cars in Asia and match local repair costs

User-friendly mobile application for drivers

API integration to cater for business needs.

Advantageously, the invention revolutionizes car insurance claims process by empowering users to inspect car damages using our AI-powered mobile app.

Advantageously, the invention may make claim appraisal efficient. For example, when there is a car accident, the invention may guide the car owners to take photos of the damage on the vehicle part and receive virtual vehicle inspection. The repair costs will be estimated within a few seconds. Insurees can have an expectation of how much repair cost is required. They can expedite the claim appraisal to receive the payment within hours. It can speed up time-consuming claim settlements and creates a better customer experience, while also increasing efficiency.

In addition, the invention may also enhance customer satisfaction, in which insurees or car rental companies does not only benefit from shorter claim processing time, but also benefit from increased customer satisfaction by an accelerated process. Alpha AI promises to help insurees and repairers to agree on repairs quicker, improving both the customer experience and Insurees' operational efficiency in claims handling, and providing an automatic car check-in and check-out solution for car rental company.

Although not required, the embodiments described with reference to the Figures can be implemented as an application programming interface (API) or as a series of libraries for use by a developer or can be included within another software application, such as a terminal or personal computer operating system or a portable computing device operating system.

Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include tablet computers, wearable devices, smart phones, Internet of Things (IoT) devices, edge computing devices, stand alone computers, network computers, cloud based computing devices and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for assessing damage conditions of a vehicle, comprising:

a computer vision-based processor operable to function as a damage identification module and a component identification module, wherein the damage identification module is arranged to identify the one or more damages captured in a set of input images showing at least a portion of the vehicle, and the component identification module is arranged to identify one or more damaged components of the vehicle with the identified damages thereon;

an output module arranged to generate a damage assessment report associated with the identified damages and/or the identified damaged components of the vehicle;

a structure detection module arranged to evaluate a structural damage associated with internal components of the vehicle based on the identified damages of the damaged components, wherein the structure detection module comprises an internal damage simulator arranged to generate a skeleton structure of the vehicle based on the identified damages of the damaged components, wherein the computer vision-based processor is further arranged to estimate at least one attribute of the damage, wherein the at least one attribute includes a type of damage, a level of damage and dimension of the identified damages.

2. The system of claim 1, wherein the computer vision-based processor includes a neural network processing engine.

3. The system of claim 1, wherein the type of damage includes a dent, scratch, crack, shattering, displacement, or any one or a combination thereof of the identified damaged component of the vehicle.

4. The system of claim 1, wherein the damage identification module is further arranged to categorize the captured damages based on the type of damage, the level of damage and the dimension of the identified damages.

5. The system of claim 1, wherein the internal damage simulator is further arranged to remap the generated skeleton structure to a corresponding model structure of the vehicle to evaluate the structural damage of the vehicle.

6. The system of claim 5, wherein the internal damage simulator is arranged to select arbitrary feature points associated from predetermined parts of the vehicle to form the skeleton structure.

7. The system of claim 5, wherein the internal damage simulator is arranged to remap the generated skeleton structure by comparing spatial coordinates of the generated skeleton structure against the corresponding model structure to identify a displacement of internal components indicating structural damage.

8. The system of claim 6, wherein the internal damage simulator comprises a pose estimation engine arranged to analyze the skeleton structure being generated.

9. The system of claim 6, wherein the internal damage simulator is arranged to select feature points corresponding to structural pillars, wheel centers, or rigid body panels of the vehicle to form the skeleton structure defining a geometry of the vehicle frame.

10. The system of claim 8, wherein the pose estimation engine comprises a Convolutional Neural Network (CNN) arranged to infer the skeleton structure directly from the set of input images by locating key structural joints of the vehicle.

11. The system of claim 1, wherein the damage assessment report includes a quotation of services associated with repairing or replacing the damaged component with the identified damages, wherein the quotation of services is calculated based on the structural damage evaluated by the structure detection module.

12. The system of claim 11, wherein the quotation of services is estimated based on a regression analysis model trained on historical claims data.

13. The system of claim 12, wherein the damage assessment report includes a quotation of add-on services associated with maintaining at least one miscellaneous item apart from repairing or replacing the damaged component.

14. The system of claim 12, wherein the quotation of services is further associated with predetermined models of vehicles and/or predetermined price range for repairing or replacing the damaged component as validated against the generated skeleton structure.

15. A platform for facilitating repairing or maintenance services of a vehicle, comprising the system of claim 11, and a computer-implemented user-interface arranged to facilitate uploading the set of input images of the vehicle captured by a user, and additional information associated with the user and/or the vehicle.

16. The platform of claim 15, further comprising a service provider matching engine arrange to provide to the user details of a service provider recorded in a service provider database and/or the quotation of services offered by the service provider based on the generated damage assessment report, wherein the service provider matching engine is arranged to filter the service provider database to select service providers possessing equipment certified to repair the structural damage evaluated by the structure detection module.

17. A method of assessing damage conditions of a vehicle, comprising the steps of:

identifying the one or more damages captured in a set of input images showing at least a portion of the vehicle;

identifying one or more damaged components of the vehicle with the identified damages thereon;

estimating, by using a computer vision-based processor, at least one attribute of the damage, wherein the at least one attribute includes a type of damage, a level of damage and dimension of the identified damages;

generating, using an internal damage simulator, a skeleton structure of the vehicle based on the identified damages of the damaged components;

evaluating a structural damage associated with internal components of the vehicle based on the generated skeleton structure; and generating a damage assessment report associated with the identified damages and/or the identified damaged components of the vehicle.

18. The method of claim 17, wherein the type of damage includes a dent, scratch, crack, shattering, displacement, or any one or a combination thereof of the identified damaged component of the vehicle.

19. The method of claim 18, further comprising the step of categorizing the captured damages based on the type of damage, the level of damage and the dimension of the identified damages to quantify a severity of the structural damage for further evaluation of a quotation of services.

20. The method of claim 19, further comprising the step of calculating the quotation of services based on the quantified severity of the structural damage using a regression analysis model trained on historical claims data, and validating the quotation against a predetermined price range associated with the identified damaged components.

\* \* \* \* \*